Sept. 13, 1966          S. A. PFISTER          3,271,853

AUTOMATIC TOOL CHANGING MECHANISM FOR MACHINE TOOL

Filed Jan. 26, 1965          3 Sheets-Sheet 1

INVENTOR.
STANLEY A. PFISTER

BY
Howard H. Keiser
& Jack J. Earl
ATTORNEYS

Sept. 13, 1966  S. A. PFISTER  3,271,853
AUTOMATIC TOOL CHANGING MECHANISM FOR MACHINE TOOL
Filed Jan. 26, 1965  3 Sheets-Sheet 2

Sept. 13, 1966          S. A. PFISTER          3,271,853
AUTOMATIC TOOL CHANGING MECHANISM FOR MACHINE TOOL
Filed Jan. 26, 1965          3 Sheets-Sheet 3
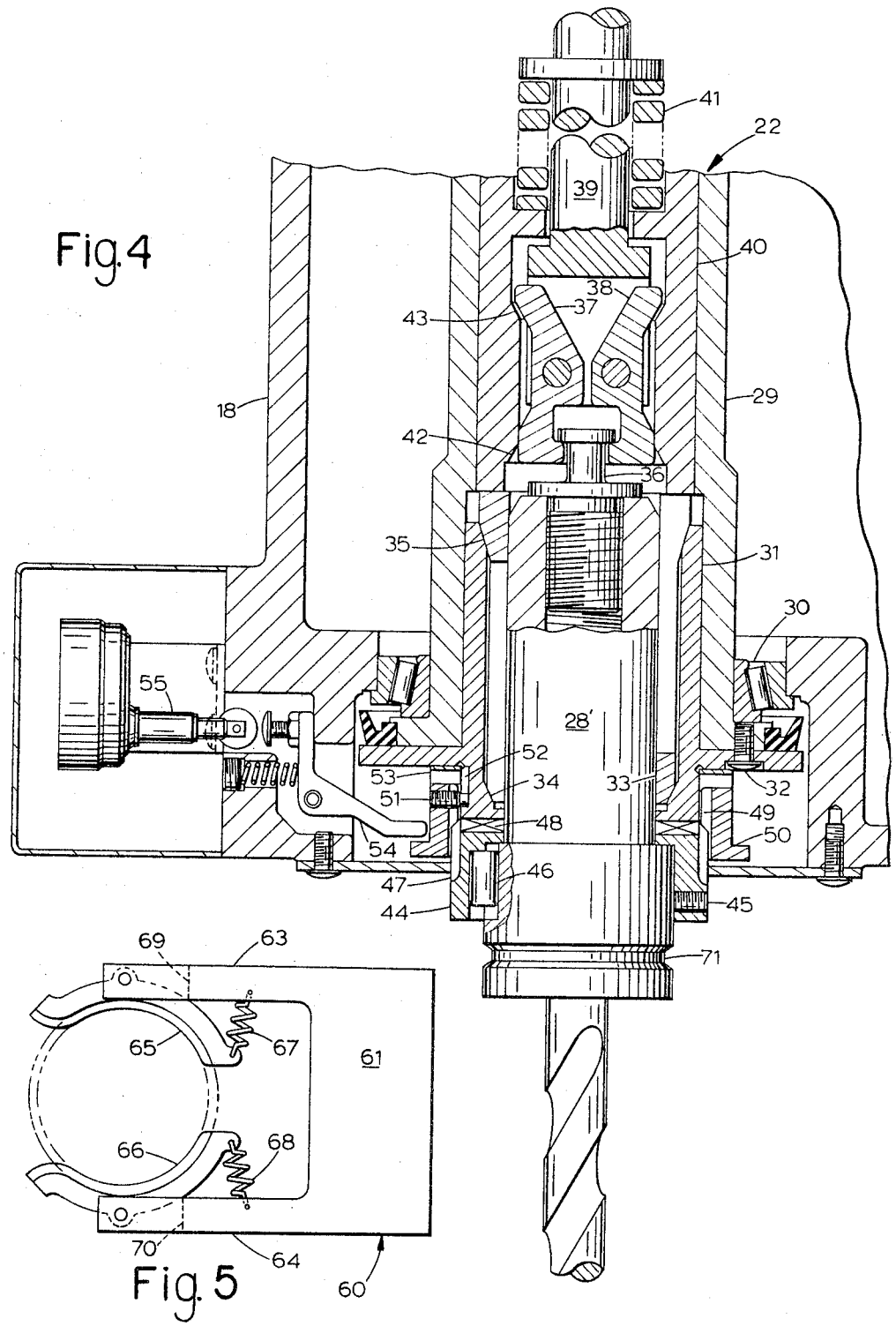

United States Patent Office 3,271,853
Patented Sept. 13, 1966

3,271,853
AUTOMATIC TOOL CHANGING MECHANISM
FOR MACHINE TOOL
Stanley A. Pfister, Wilmington, Ohio, assignor to The Cincinnati Milling Machine Co., Cincinnati, Ohio, a corporation of Ohio
Filed Jan. 26, 1965, Ser. No. 428,086
5 Claims. (Cl. 29—568)

This invention relates to automatic tool changing mechanisms which are particularly suited for use in machine tools such as milling, drilling and boring machines.

It is an object of this invention to provide a machine tool with a mechanism of relative simplicity to perform tool changing under automatic control.

It is also an object of this invention to provide a tool changing mechanism that is adapted for use with a machine tool of standard configuration without substantial modification of the basic machine.

A further object is the provision of a tool changing mechanism having a comparatively low cost of assembly and application to a machine.

Another object of the invention is to provide a tool changing mechanism having a magazine with a relatively large capacity for tool storage.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Briefly, the mechanism of this invention includes a tool magazine which in its preferred form is conically shaped and supported for rotation on an axis through its center. The axis of rotation of the tool magazine is oriented to intersect the fixed axis on which a machine spindle is supported for rotation at an angle of less than ninety degrees. The tool magazine is supported in a position such that when the spindle is retracted to one end of its path of movement along its axis of rotation, the spindle is moved to a position inside the conical space surrounded by the magazine. The spindle is also movable away from the magazine to a position in which a cutting tool, fixed at its one end opposite the magazine, is positioned to engage a workpiece in a machining operation. The magazine has a set of tool grippers fixed in a circular array around and inside its base end and each of these is adapted to releasably grip and hold a cutting tool so that the longitudinal axis of the cutting tool is oriented to intersect the axis on which the magazine is rotated at the same angle as formed by the intersection of the axes of the spindle and magazine. Therefore the magazine can be rotatably positioned by an index motor to each of a series of tool change positions in which a corresponding one of the tool grippers is positioned in a change position where it is adapted to hold a tool parallel to the spindle axis. The magazine is movable in a direction transverse to the axis of the spindle to position the tool gripper in the change position at a location wherein the axis of the tool therein coincides with the spindle axis. The spindle is movable along its path of movement to insert the tool so held in the spindle where it is gripped and the magazine can then be moved away leaving the tool in the spindle. In the preferred form, the tool grippers are each adapted to snap on and off of a tool as each gripper is moved transversely into contact with a tool so that each gripper can be moved to change position to grip a tool prior to its release from the spindle to pick up that tool as well as to be moved away from a tool after it is gripped by the spindle. In this manner, the rotation of the magazine, its transverse motion and the axial motion of the spindle itself are used to select and change any of the plurality of tools in the magazine to and from the spindle.

A clear understanding of the construction and operation of the tool change mechanism of this invention can be obtained from the following detailed description in which reference is made to the attached drawings wherein:

FIG. 4 is a section view of part of the machine of FIG. 1 taken along the reference line 4—4.

FIG. 5 is a partial view in elevation from reference line 5—5 on FIG. 1.

Figure 1:
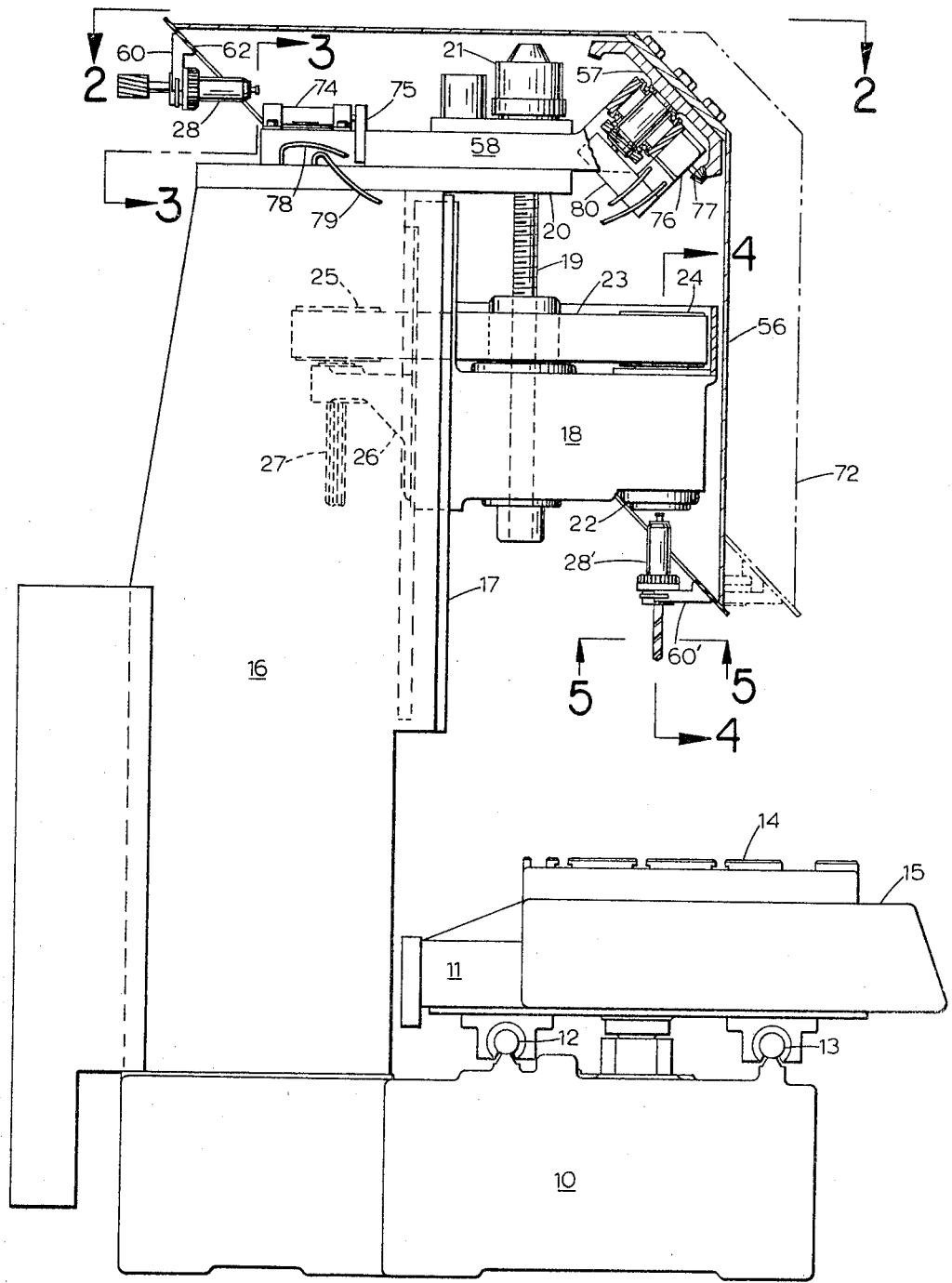
FIG. 1 is a side elevation view, partly in section showing a vertical drilling and milling machine equipped with the automatic tool changing mechanism of this invention.

An upright or vertical drilling and milling machine is shown in FIG. 1 and this machine is equipped with the tool change apparatus of the present invention. The machine is comprised of a base 10 on which a saddle 11 is supported by round bar ways 12, 13 for movement toward and away from the viewer with respect to FIG. 1. A table 14 is supported on the saddle by a pair of round bar ways (hidden in the drawing by a splash guard 15 fixed around the table 14) similar to the ways 12, 13 but at right angles thereto. Thus the table is movable in two directions to provide two dimensional positioning. A column 16 is fixed to the rear of the base 10 and extends upward to a position above and to the rear of the table 14. The column 16 has a pair of slide ways 17 on the forward face thereof on which a spindle carrier 18 is attached for sliding movement toward and away from the table 14. The spindle carrier 18 is movable along the ways 17 by rotation of a feed screw 19 that is axially fixed but rotatably supported through an overarm member 20 atop the column 16 and is in threaded engagement through the carrier 18. The feed screw 19 is powered by a variable speed motor 21 fixed onto the overarm 20 at the upward end of the screw 19. The carrier 18 has a spindle mechanism 22 which is driven by a belt 23 that is received around a sheave 24 at the rearward end of the spindle mechanism 22. The belt is also received over a sheave 25 that is carried inside the column 16 by a bracket 26 which extends into the column 16 from the rear of the carrier 18 and between the ways 17. The sheave 25 is engaged over a spline shaft 27 so that the sheave 25 can move along the column while it is maintained in train with a geared drive transmission (not shown) of the conventional machine tool type producing any selected one of a multitude of predetermined speeds of spindle drive.

As shown in FIG. 4, the spindle mechanism 22 is adapted at its forward end to receive a cutting tool 28′ and to releasably hold the tool 28′ therein. The mechanism includes a hollow spindle member 29 that is supported in the carrier 18 by bearings 30 at each end (only the forward end shown in the partial section of FIG. 4). A bushing 31 is held fixed in the spindle 29 by machine screws 32 and a split collet 33 is loosely received in side the bushing 31 where it is adapted to engage against conical surfaces 34, 35 which contract the collet 33 against the cylindrical adapter shank portion of the tool 28′ when an axial force is applied to force the collet into the bushing 31. The rearward end of the tool 28′ has a bayonet adapter 36 threaded into it and this is adapted to be gripped by a pair of members 37, 38 that are pivotally movable in a scissors like motion in the end of a rod 39 extending into the spindle 29 and fixed relative thereto. A generally cylindrical plunger 40 is received in the spindle 29 and around the rod 39 and is axially movable in the spindle 29. A strong coil spring 41 is compressed behind the plunger 40 to force it toward the collet 33 which is in turn forced forward in the bushing 31 to cause the collet 33 to contract to grip and center the tool 28′ in the spindle 29. At the same time, the gripper members 37, 38 are cammed to the position shown by the chamfered surface 42 around the forward end of the plunger 40 and they grip the bayonet adapter 36 to hold the tool 28′ in a fixed axial position in the spindle 29. The gripper members 37, 38 are shaped so that as they grip they tend to cam the tool 28′ rearward so that a bias force is produced to hold the tool firmly seated. The plunger 40 is movable rearward against the bias of the spring 41 by a piston and cylinder motor (not shown) to allow the grippers 37, 38 to release the bayonet adapter and to allow the collet 33 to release its grip on the tool 28′. The plunger 40 has a second chamfered surface 43 which cams the grippers 37, 38 together at their rear and open at their forward ends to release the bayonet 36.

The tool 28′ has a collar 44 fixed thereto by a set screw 45 and a key 46. The collar has a set of gear teeth 47 axially along its outer diameter surface and a set of radially extending teeth 48 around its rear face mating with similar teeth of the bushing 31. The teeth 47 are adapted to mesh with teeth 49 inside a ring 50 that is received over the bushing 31 and held in place thereon by a set screw 51 extending through the ring 50 and loosely into a slot 52 along the side of the ring 50. The ring 50 is normally in the position shown due to the force of a corrugated spring washer 53 received between the ring 50 and the mounting flange of the bushing 31. This arrangement is provided so that when the tool 28′ is inserted into the spindle 29, the teeth 47, 49, if not aligned, produce interference one against another to lift the ring 50 which then engages against a lever 54 pivotal in the carrier 18. The lever is then swung to actuate a limit switch 55 that produces a signal to jog the spindle and change its angular position until the teeth 47, 49 mate and the tool is seated firmly at the face clutch teeth 48 through which rotational drive is transmitted from the spindle 29 and bushing 31 to the tool 28′ by way of the collar 44 and key 46.

Figure 2:
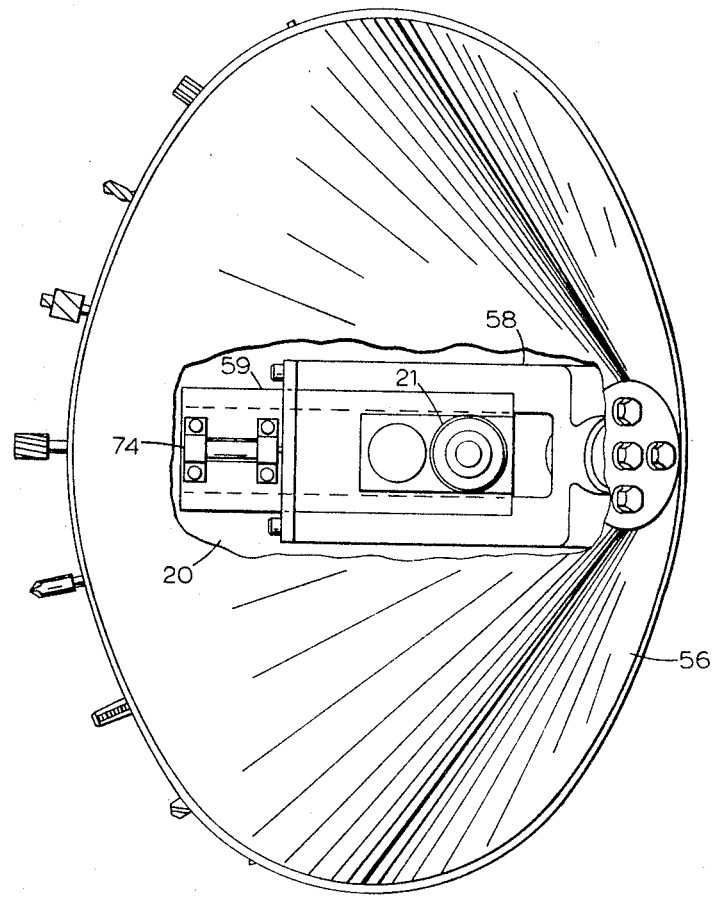
FIG. 2 is a plan view of the tool magazine of the machine shown in FIG. 1 and as viewed from reference line 2—2 indicated thereon, a part of the magazine being shown broken away to reveal a portion of the magazine support and indexing mechanism.
Figure 3:
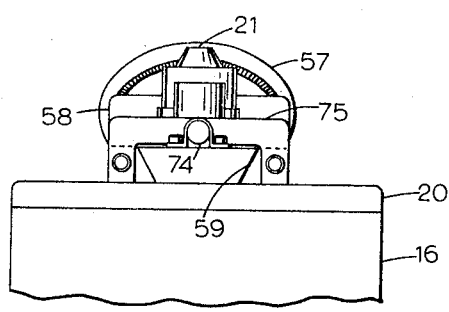
FIG. 3 is a rear elevation of a portion of FIG. 1 as viewed along the reference line 3—3 indicated thereon.

The tools, such as the tool 28′ and other tools 28 are automatically exchanged between the spindle mechanism 22 and a magazine 56. The magazine, as shown best in FIGS. 1 and 2, is generally conical in shape and is oriented to fit over the spindle carrier 18 in the retracted position. The magazine 56 can be graphically described as having the form of a "coolie hat" supported on a tilted axis over the top of the column 16 and spindle carrier 18. The magazine 56 is secured to a combination bevel gear and stub shaft member 57 that is supported in bearings for rotation relative to a supporting slide member 58 received on the overarm 20 for movement along dovetail ways 59. The axis of rotation of the magazine 56 intersects the longitudinal axis of the spindle mechanism 22 at a fixed acute angle regardless of the position of the slide 58 along the overarm 20 since the direction of movement of the slide 58 on the overarm 20 is in a straight line only. In the preferred form shown, the axis of rotation of the magazine 56 bisects the angle formed between the axis of the spindle mechanism 22 and the direction of travel of the slide 58.

The magazine 56 carries a plurality of tool gripping mechanisms 60 in equispaced locations around the open or base end of its conical shape. Thus the tool gripping mechanisms 60 are in circular array extending around the spindle carrier 18. Each of the gripping mechanisms 60 is adapted to hold a tool 28 in a fixed axial position with respect to the magazine 56. Each tool 28 is oriented with its axis intersecting the axis of rotation of the magazine 56 at the same angle as formed between the axis of the spindle mechanism 22 and the magazine axis. The detail of the gripper mechanism 60 is shown in FIG. 5. Each of the mechanisms 60 has a bracket member 61 that is fixed to an annular member 62 welded around the base of the conical magazine 56. The bracket 61 has two spaced finger projections 63, 64 forming yokes to each of which an arcuate member 65, 66, respectively, is pivotally connected. Each of these members 65, 66 is biased toward the position shown by a spring 67, 68 connected between the fingers 63, 64 and the rearmost end of the members 65, 66. The arcuate members 65, 66 can rotate only as far as the position shown under the bias of the springs 67, 68 due to the interference of a shoulder 69, 70 in the fingers 65, 66. The forward ends of the arcuate members 65, 66 are turned outward in a reverse curve so that when the gripper mechanism 60 is relatively moved transversely over a tool 28, the arcuate members 65, 66 will be cammed apart to snap over the tool 28. As shown in FIG. 4, each of the tools has a groove 71 extending circumferentially around it and the arcuate gripper members 65, 66 are complementarily shaped in cross section to fit closely into this groove 71 to provide resistance to axial movement of the tools 28 in the grippers 60.

The entire magazine 56 is movable transversely relative to the spindle 22 between a tool change position, shown in FIG. 1 and an idle position 72, indicated by the phantom showing in FIG. 1. When the magazine 56 is in the change position a selected one of the tool grippers 60′ is positioned to hold the tool 28′ with the longitudinal axis thereof coincident with the longitudinal axis of the spindle mechanism. Therefore the spindle carrier 18 can be lowered by operation of the motor 21 and screw 19 to insert the tool 28 into the spindle as shown in FIG. 4 and then the bayonet gripping mechanism described is operated through conventional control circuitry to grip the tool and hold it in the spindle. The magazine 56 is then moved transversely to the idle position 72 by a piston and cylinder motor 74 mounted on the overarm 20 and connected to a yoke 75 fixed to the rear of the slide 58 and bridging over the dovetail ways 59. When the magazine 50 is in the idle position 72, the motor 21 and screw 19 are utilized to feed the carrier 18 on downward since it now clears the magazine 56 and the other tools 28 and the gripper 60′.

The reverse operation is followed to remove the tool 28′ from the spindle 22. The carrier is raised to the level at which the gripper 60′ will contact the tool 28′ at its groove 71 and is then stopped. The magazine 56 is shifted to its change position by the motor 74 to snap the gripper 60′ over the tool 28′. The bayonet gripping member 37, 38 and the collet 33 are released and the carrier 18 is raised to the position shown in FIG. 1. The magazine can then be rotated to any one of a number of other angular positions by operation of a fluid motor 76 that is attached to the forward end of the slide 58 and which drives a pinion 77 that is engaged with the gear member 57. Fluid is supplied to the motor 76 through flexible fluid lines 78, 19 and a position analog generator 80 is provided to produce position feedback signals corresponding to the angular position of the magazine. The magazine 56 then can be automatically brought to a preselected position through conventional servo control techniques utilizing command and feedback signal comparison. A detailed description of the servo system is deleted herein since such angular positioning mechanisms are well known in the art in a variety of forms, any of which is adaptable for use with the magazine 56 that will move an object angularly to a preselected position.

In each of the predetermined angular positions to which the magazine is movable, one of the grippers will be in a position to hold a selected one of the tools 28 with its axis parallel to the axis of the spindle 22 and when the magazine 56 is in the change position, the axes of the two will coincide. In this manner any one of the tools 28 can be changed to and from the spindle 22 under automatic control. It can be seen that only the simplest type of controls are required to operate the feed motor 21, the piston and cylinder motor 74 and the index motor 76 and the piston (not shown) which operates to release the bayonet grippers 37, 38 and collet 33. The mechanisms employed in the system are uncomplicated and the movements that they make are simple thus providing a relatively inexpensive mechanism for automatic tool changing which is conveniently maintained without highly skilled mechanics.

What is claimed is:

1. Apparatus for interchanging a selected one of a plurality of cutting tools in a machine tool comprising in combination:
   (a) a spindle rotatable on a fixed axis and adapted to receive and releasably hold each of the cutting tools when inserted axially into said spindle,
   (b) means for supporting said cutting tools in a circular array around said spindle with the longitudinal axis of each cutting tool lying along the slope of a conical surface,
   (c) means for rotating said circular array of tools through a series of positions in each of which series of positions one of the tools defining the selected tool is oriented with its longitudinal axis parallel to the fixed axis of said spindle,
   (d) means for shifting said circular array of tools in a direction transverse to said spindle to shift said selected tool to and from a position wherein the longitudinal axis thereof is coincident with the fixed axis of said spindle, and
   (e) means for moving said spindle along the fixed axis thereof for insertion of the selected tool therein.

2. Apparatus for interchanging a selected one of a plurality of cutting tools in a machine tool comprising in combination:
   (a) a spindle rotatable on a fixed axis and adapted to receive and releasably hold each of the cutting tools when inserted axially into said spindle,
   (b) a tool magazine of generally conical shape,
   (c) means for supporting said magazine over said spindle for rotation about an axis intersecting the axis of said spindle at a fixed angle,
   (d) means for releasably holding said cutting tools in spaced locations around the base end of said magazine with the longitudinal axis of each intersecting the axis of rotation of said magazine at the same angle as said fixed angle,
   (e) means for rotating said magazine selectively to each of a plurality of positions wherein a selected one of said tools is parallel to the axis of said spindle,
   (f) means for shifting said magazine transversely with respect to the axis of said spindle between an idle position and a change position wherein the longitudinal axis of the selected one of said tools is coincident with the axis of said spindle, and
   (g) means for moving said spindle along the axis thereof for insertion of the selected tool therein.

3. Apparatus for interchanging a selected one of a plurality of cutting tools in a machine tool comprising in combination:
   (a) a spindle rotatable on a fixed axis and adapted to receive and releasably hold each of the cutting tools when inserted axially into said spindle,
   (b) a tool magazine of generally conical shape,
   (c) means for supporting said magazine over said spindle for rotation about an axis intersecting the axis of said spindle at a fixed angle,
   (d) a plurality of tool holders fixed to said magazine and spaced around and inside the base thereof, each holder adapted for releasably gripping one of the cutting tools when moved transversely thereover and for holding a gripped cutting tool axially fixed relative to said magazine,
   (e) means for rotating said magazine to each of a plurality of positions wherein a selected holder is located for gripping and holding a cutting tool parallel to the fixed axis of said spindle,
   (f) means for shifting said magazine transversely relative to said spindle between an idle position and a change position wherein the selected one of said holders is adapted to grip and support a cutting tool with the longitudinal axis thereof coincident with the axis of said spindle, and
   (g) means for moving said spindle in one direction along the axis of rotation thereof for insertion of a cutting tool in said selected holder into said spindle and in the other direction away from the selected holder to withdraw a cutting tool from said spindle.

4. Apparatus for interchanging a selected one of a plurality of cutting tools in a machine tool comprising in combination:
   (a) a spindle rotatable on a fixed axis and adapted to receive and releasably hold each of the cutting tools when inserted axially into one end of said spindle,
   (b) a tool magazine of generally conical shape,
   (c) a support slide on the machine movable in a direction transverse to the fixed axis of said spindle and spaced from the other end of said spindle,
   (d) means for attaching said magazine to said slide for rotation on an axis angularly disposed to bisect the angle between said fixed axis of the spindle and direction of movement of said slide,
   (e) means for releasably holding said cutting tools in spaced locations around the base end of said magazine with the longitudinal axis of each cutting tool intersecting the axis of rotation of said magazine at the same angle as the fixed axis of said spindle,
   (f) means for rotating said magazine selectively to each of a plurality of positions wherein a selected one of said tools is parallel to the fixed axis of said spindle,
   (g) means for shifting said support slide to carry said magazine between an idle position and a change position wherein the longitudinal axis of the selected one of the cutting tools is coincident with the fixed axis of said spindle, and
   (h) means for moving said spindle along the axis thereof for insertion of the selected tool therein.

5. Apparatus for interchanging a selected one of a plurality of cutting tools in a machine tool comprising in combination:
   (a) a spindle rotatable on a fixed axis and adapted to receive and releasably hold each of the cutting tools when inserted axially into one end of said spindle,
   (b) a tool magazine of generally conical shape,
   (c) a support slide on the machine movable in a direction transverse to the fixed axis of said spindle and spaced from the other end of said spindle,
   (d) means for attaching said magazine to said slide for rotation on an axis angularly disposed to bisect the angle between said fixed axis of the spindle and the direction of movement of said slide, (e) a plurality of tool holders fixed to said magazine and spaced around and inside the base thereof, each holder adapted for releasably gripping one of the cutting tools when moved transversely thereover and for holding a gripped tool axially fixed relative to said magazine with the longitudinal axis thereof intersecting the axis of rotation of said magazine at the same angle as the angle of intersection of said fixed axis of the spindle and the axis of rotation of said magazine, (f) means for rotating said magazine to each of a plurality of positions wherein a selected one of said holders is located for gripping and holding a cutting tool parallel to the fixed axis of said spindle, (g) means for shifting said support slide to carry said magazine between an idle position and a change position wherein the selected one of said holders is adapted to grip and support a cutting tool with the longitudinal axis thereof coincident with the axis of said spindle, and (h) means for moving said spindle in one direction along the fixed axis of rotation thereof for insertion of a cutting tool in said one selected holder into said spindle and in the other direction away from said one selected holder to withdraw a cutting tool from said spindle.

No references cited.

RICHARD H. EANES, JR., *Primary Examiner.*